Zbigniew Stachurski
INVENTOR.

BY Karl F. Ross
Attorney

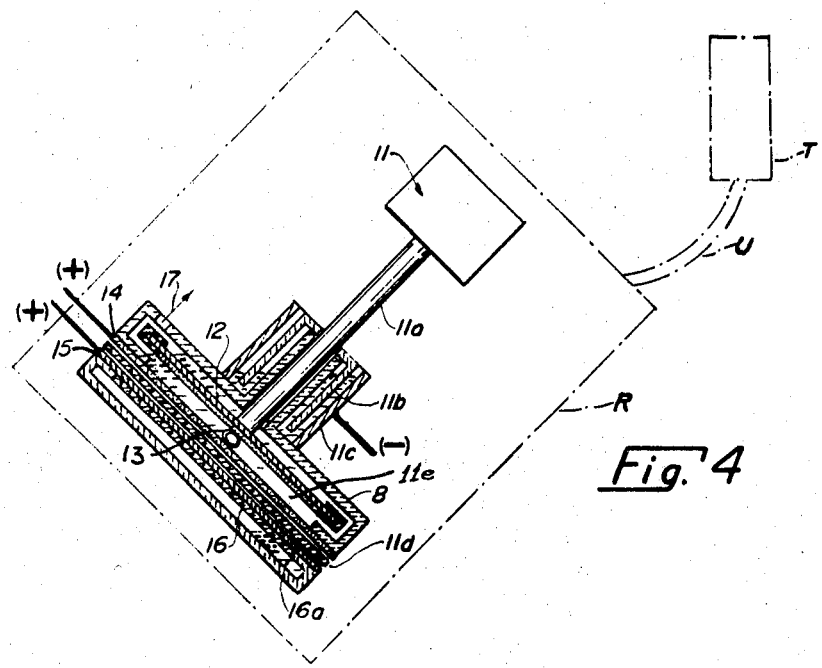
Fig. 4
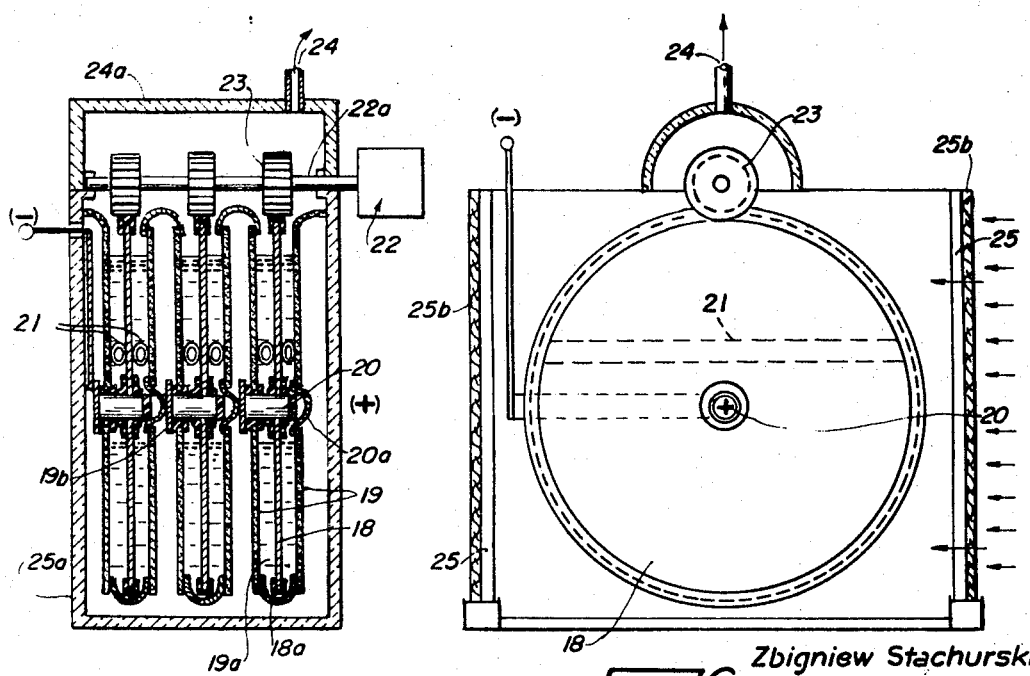
Fig. 5
Fig. 6
Zbigniew Stachurski
INVENTOR.
BY Karl F. Ross
Attorney United States Patent Office 3,440,098
Patented Apr. 22, 1969

3,440,098
RECHARGEABLE CURRENT-GENERATING ELECTROCHEMICAL SYSTEM WITH WIPER MEANS
Zbigniew Stachurski, New York, N.Y., assignor to Yardney International Corp., New York, N.Y., a corporation of New York
Filed Mar. 19, 1965, Ser. No. 441,265
Int. Cl. H01m 35/00, 45/02
U.S. Cl. 136—6                                       6 Claims

ABSTRACT OF THE DISCLOSURE

There is disclosed a current-generating electrochemical system characterized by cooperation between the electrode and a means sweeping the electrode for decreasing destructive phenomena occurring at the interface. An active electrode is juxtaposed with at least one counterelectrode and co-operates with a wiper or deflecting member, preferably disposed adjacent the surface of the reversible electrode to compact the active layer deposited upon its electrolyte-contacting face. Either the wiper or the electrode can be mounted for relative displacement with respect to the other.

---

My present invention relates to current-generating electrochemical systems and, more particularly, to cells whose efficiency, useful life and applicability depend upon the interaction of one or more electrodes and an electrolyte in contact therewith.

In the concurrently filed copending application Ser. No. 441,069 of Z. Stachurski, J. Bockris and G. Dalin, there is described and claimed an improved current-producing electrochemical system designed to obviate a number of the difficulties arising in connection with the interaction of an electrode and an electrolyte in such systems. According to that application, the state of the active material of an electrode of a primary or "single-discharge" cell in contact with an electrolyte can be maintained without depletion of activity or efficiency, an electrode to which a reactant is continuously fed (e.g. a fuel or gas electrode) can be operated at high current density or an electrochemically reversible electrode whose active mass is subject to reduction of discharge efficiency, growth of shorting bridges or even limitations in the possibilities of depositing the active material in a suitable condition can receive a relatively uniform and homogeneous deposit upon relative displacement of the members of the electrochemical system at a rate in excess of a particular threshold value dependent upon the difficulty encountered. Thus, an electrochemically reversible electrode (e.g. a zinc/zinc-oxide electrode subjected to charge/discharge cycling) is prone to redistribution and inactivation of the active material at least in part as a consequence of the development of concentration gradients in the electrolyte. Moreover, an electrode to which the active material is continuously fed is limited in output by the existence of a diffusion layer, this diffusion layer also resulting in the development of dendritic deposits with certain electrodes which tend to bridge the interelectrode gaps.

The principal object of the present invention is to provide a current-generating electrochemical system in which the high rates of relative displacement required for the practice of the invention described in the aforementioned copending application can be dispensed with and a high degree of control of the electrode reactions obtained in a current-generating cell.

This object and others which will become apparent hereinafter are attained, in accordance with the present invention, by the co-operation between the electrode of a current-generating system and a means sweeping the electrode for decreasing destructive phenomena occurring at the interface and otherwise improving the effectiveness of the electrode for current-generating purposes. Thus, according to the invention, an active electrode can be juxtaposed with at least one counterelectrode and co-operate with a wiper or deflecting member, preferably disposed adjacent the surface of the reversible electrode member, to compact, for example, the active layer deposited upon its electrolyte-contacting face. The wiper member thus co-operates with the electrodes to limit the destructive phenomenon. Drive means can be provided for one of the relatively displaceable members to sweep the wiper member across the surface at least during deposition of the dendritic material thereon to compact the layer; the dendrites, normally growing transversely to the surface, are thus deflected toward the surface and reoriented to provide a relatively dense layer whose activity is substantially undiminished and which is capable of higher discharge rates than the uniform layers deposited merely by relative displacement of the electrode members.

According to a further feature of the present invention, the wiper member is maintained relatively stationary within the housing of the electrochemical system while the reversible electrode member is displaced with respect to the deflecting member and is preferably rotated about a centrally disposed axis transverse to the surface. Thus, in its optimum configuration, the rechargeable electrode, e.g. a sheet-like current collector upon which zinc can be deposited from the electrolyte, has a disk configuration and is juxtaposed with, but axially spaced from, a counterelectrode; the deflecting member has, according to the invention, a layer-engaging face which includes with the layer an acute angle of attack ranging between substantially 0° and 30° although angles of only up to 5° are even more desirable and a range of intermediate preference is substantially 1° to 20°. The deflecting member can be a wiper blade having a generally planar layer-engaging face, although it is preferred that the face be arcuately convex in the direction of the electrode surface. In either case, it is an important characteristic of the invention that the wiper member be inherently elastic and relatively soft so as to be incapable of stripping the layer from the electrode surface, but adapted to co-operate therewith to smooth the deposit as it is formed. Best results are obtained when the wiper is a tube of relatively soft elastomeric material (e.g. rubber), a resiliently deformable face of which bears upon the layer. It is also possible to employ one or more rollers for the compaction of the layer in which case at least the periphery of the roller will be resiliently suspended from its axle so that the roller yieldably bears upon the layer.

According to a more specific feature of this invention, the reversible electrode member is journaled in the housing while the drive means engages this disk either along its periphery or via a shaft axially secured thereto. In the former case, the rechargeable electrode member can be flanked by a pair of counterelectrodes defining at least in part an enclosure for the electrolyte while the counterelectrodes can be of the electrochemically reversible type (e.g. having nickel/nickel-oxide or silver/silver-oxide active masses). Particularly effective results are obtained when a gas-depolarized porous electrode serves as the counterelectrode juxtaposed with the rotating disk. The housing means can thus include means for supplying the gas-depolarized electrode with air or another depolarizing gas. The gas-depolarizable electrode may be employed to recharge the reversible electrode directly, or, according to a modification of the system, the reversible electrode can be charged against a relatively inert auxiliary electrode as described and claimed in the commonly assigned copending application Ser. No. 125,779, filed July 21, 1961 and entitled "Rechargeable Fuel Cell," now patent No. 3,219,486, or described in the above-identified concurrently filed application Ser. No. 441,069.

Still another feature of the present invention resides in the formation of the layer-engaging face of the wiper member or the co-operating electrode member with recurrent deformations (e.g. corrugations) for imparting to the layer an undulate configuration which apparently increases the effective area of the mass and renders it still more amenable to high-rate discharge.

It has been found that best results are obtained when, as previously indicated, the electrode is rotated at a rate less than that required to reduce the width of the diffusion layer as discussed in said copending application and preferably between about 1 and 100 revolutions/min. The minimum rate of rotation must be such that all portions of the layer are engaged by or intercepted by the wiper member at least once during the cyclic movement in the time required for growth of a dendritic bridge across the interelectrode gap. If the rate of growth of dendritic bridges is defined as V and the distance between the electrodes as L, the time T required for growth of the dendritic bridge and shorting of the cell member equals $L/V$. According to an essential feature of the present invention, this time T must be greater than or at least equal to the time $t$ required for the wiper to sweep each portion of the surface of the layer in successive passes. The rate of sweeping of the surface can then be defined by the characteristic period $t \leq T$ and the rate of displacement $v$, in terms of cycles per unit time, must be $v \leq V$.

While dendritic zinc has been discussed hereinabove as an important active material for a current-generating electrochemical system and as highly prone to destructive phenomena adapted to be obviated by the use of the wiper means according to the present invention, it will be understood that other active materials can also be employed. For example, tin may be substituted for zinc while deposition of lithium (e.g. from nonaqueous and other electrolytes) can also be carried out. The alkaline systems described for the deposition of zinc may be replaced by acid systems when other active materials are to be deposited, the gas or air electrodes preferably including noble metals (e.g. silver, gold, metals of the platinum group) in combination with antiwetting agents and especially hydrophobic resins (e.g. polytetrofluoroethylene) and/or carbon. Auxiliary electrodes serving for charging the electrochemically reversible electrode can include nickel, stainless steel and other inert metals in the form of grids, rods, plates, disks and the like. The depolarizing gases can include halogen (e.g. chlorine and fluorine) in addition to air or pure oxygen. The present invention this affords the possibility of a lithium/fluorine cell of high available power per unit weight or volume. The fluorine can thus be the depolarizer of a gas electrode while lithium is deposited at an active electrode and is discharged thereon.

The above and other objects, features and advantages of the present invention will become more readily apparent from the following description, reference being made to the accompanying drawing in which:

FIG. 4 is an axial cross-sectional view somewhat diagrammatically illustrating a rotary-electrode oxygen-depolarized cell having a centrally driven electrode member and a gas-depolarized counterelectrode;

FIG. 5 is an axial cross-sectional view of an arrangement wherein the movable electrodes are peripherally driven;

FIG. 6 is an end view of the battery of FIG. 5;

Figure 3:
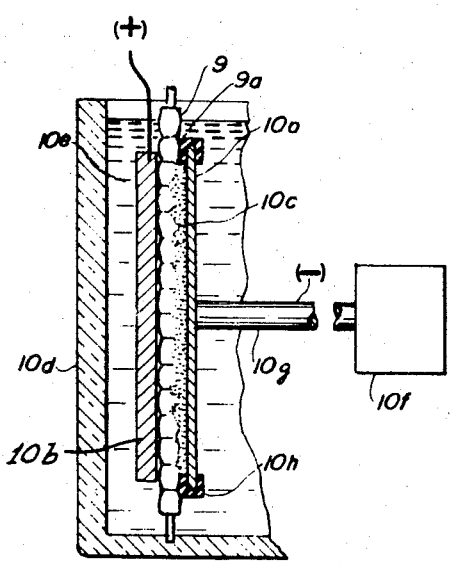
FIG. 3 is a side-elevational view of the electrode assembly of a rotatable electrode cell according to another embodiment of the invention.

Referring first to FIG. 3 of the drawing, it will be seen that the basic elements of a battery or cell according to the present invention are a movable electrode 10a, which is here shown as a disk of a current-collecting sheet material (steel, copper, silver-plated steel, etc.), and a counterelectrode 10b. As previously described, the present invention is most advantageous when the counterelectrode is a gas-depolarized electrode; member 10b can thus consist of a catalyst-containing porous plate to which a depolarizing gas is supplied as described in the commonly assigned copending application Ser. No. 409,324 filed Nov. 5, 1964 by Maurice Lang entitled Fuel-Cell Electrode and now abandoned. It is also possible to employ, as counterelectrodes for the zinc/zinc-oxide electrode 10a, gas-depolarized electrodes containing noble-metal catalysts as described in the aforementioned Patent No. 3,219,486 and even electrodes consisting predominantly of hydrophobic resins (polytetrafluoroethylene) and catalytically effective noble metals (e.g. gold, silver, and metals of the platinum group). The present invention may also make use of rechargeable or electrochemically reversible cathodes of the type conventionally employed in a current-producing couple with a zinc/zinc-oxide anode; of most significance in this regard are silver/silver-oxide and nickel/nickel-oxide electrodes. The electrochemically reversible anode 10a is adapted to receive, upon charging of the electrochemical system against the counterelectrode 10b or an auxiliary electrode (e.g. of nickel or stainless steel) as mentioned above, a layer 10c of dendritic crystals which normally grow in a direction perpendicular to the surface upon which they are deposited and in the direction of the opposing electrode. In the absence of special precautions, the dendritic growths span the interelectrode gap and short-circuit the cell. The latter may be provided with the usual housing 10d which encloses an electrolyte 10e from which the metal is deposited upon charging. In the case of zinc/zinc-oxide electrodes, the electrolyte can be an alkaline solution and preferably contains an excess of a substance containing the active metal (e.g. zinc oxide). The zinc oxide may fully saturate the solution (as zincate) and the latter can be in equilibrium with a solid phase of this substance to maintain the saturated condition. It has been found that the dendritic bridges normally present in the cells can be obviated if the system includes a drive means, such as an electric motor 10f whose shaft 10g is coupled with the disk-shaped current collector 10a forming the reversible electrode member. With zinc/zinc-oxide active material and an aqueous potassium-hydroxide electrolyte, a disk electrode without a wiper and having a diameter of about 5 cm. can be effectively provided with a smooth and uniform deposit of the active material when the angular velocity of the disk ranges between 100 and 1400 revolutions per minute; in fact, it has been found that velocities in excess of about 200,000 cm. per minute and as low as about 250 centimeters per minute ensure a uniform deposit. When a wiper is used, however, the speed can be reduced to about 1 to 100 r.p.m. with velocities correspondingly reduced. The motor 10f may be operated, according to this invention, only during charging and also serves to break any dendritic bridges which may form during the initial moments of such charging when commencement of rotation lags behind charging. It is, however, also possible to rotate the disk continuously during both charging and discharging of the cell.

As previously noted, the period of cyclical movement of the wiper member, if the latter is displaced continuously or intermittenly (e.g. in the manner of a windshield wiper) or of the movable electrode member is less than the time required for dendritic bridges to form. By way of example, it may be pointed out that zinc, deposited from a 44% potassium hydroxide at 40% zincate saturation at a current density of about 2.1 ma. per cm.$^2$, will grow from the deposition surface at a rate V of about 1 mm./h. If the distance L between the electrodes of the cell is 1.5 mm., a bridge will form tending to short-circuit the electrode in 1.5 hours and the sweeping period $t$ should be 1.5 hours or less. This, of course, constitutes the minimum period necessary to prevent bridge formation. It has been found that more rapid rotation rates (i.e. smaller cyclic sweeping period) increase the density of the deposit so that at 4 cycles per minute the porosity of the deposited layer decreases to about 80% from a porosity as high as 99.8% with no sweeping movement.

It is also possible, under similar operating conditions, to form dendritic or filamentary deposits of tin. Moreover, lithium can yield a microcrystalline and somewhat dendritic deposit from a nonaqueous medium (e.g. lithium chloride and propylene carbonate mixtures).

As indicated earlier, it is desirable to compact the deposited layer against the surface of the reversible electrode and thus deflect the dendrites from their normal direction of growth (transverse to the surface and toward the juxtaposed electrode) into an orientation in which the dendrites lie at least in part along the surface. The densified layer is relatively smooth and is even more desirable because it admits of higher discharge rates than the nondensified layer. In accordance with the principles of the invention, therefore, the rotating electrode 10a (FIG. 2) can co-operate with wiper means for deflecting the dendrites by mechanical engagement with the layer.

Figure 2:
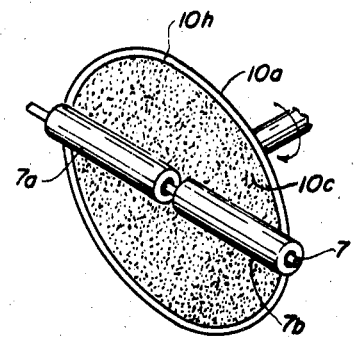
FIG. 2 is a perspective view of the electrode and the smoothing device drawn to a reduced scale.

The deflecting means can include one or more wipers in the form of elastic tubes 7a, 7b (FIG. 2) freely rotatable on and held in place by, for example, a rod 7 and engaging the layer 10c deposited upon the disk 10a. In FIG. 3, the tube 9 performing this function is corrugated and of undulating configuration at 9a and is nonrotatable while being elastically deformable to smooth, densify and corrugate the layer. As seen in FIG. 2, the periphery 10h of the disk is insulated, for example, by insulating tape, a flexible rubber channel or the like extending axially beyond the layer so as to control and frame the growth area thereof.

Figure 1:
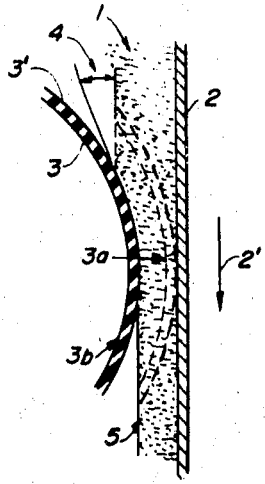
FIG. 1 is a diagrammatic sectional view of a disk electrode, showing a smoothing means co-operating therewith.

The deflection is illustrated in greater detail somewhat schematically in FIG. 1, wherein the zinc dendrites 1 are seen to grow generally transversely to the electrode surface 2 which is displaceable in the direction of arrow 2' via the drive means described above or any of those discussed hereinbelow. The tube or wiper 3 is composed of an elastic material and thus bears resiliently upon the dendritic layer 1 while having a layer-engaging face 3' arcuately convex in the direction of the layer and including an acute angle 4 therewith. It will be seen that the direction of dendritic growth is changed as the dendrites are deflected toward the surface 2 and the layer is compacted. Upon initiation of dendrite deposition, the tube 3 occupies the position shown at 3a in dot-dash lines and is resiliently compressed during build-up of the layer 5 to its solid-line position 3b. While an arcuate layer-engaging face is shown in FIG. 1, it will also be apparent that a planar blade surface similarly inclined can be used and that the surface can be frictionally entrained by the disk and rotatable as illustrated in FIG. 2. Moreover, the active electrode can be generally drum-shaped with a cylindrical deposition surface, if desired.

In FIG. 4, there is shown an electrochemical system embodying the present invention and employing an air-depolarized counterelectrode. In this arrangement, the housing 8 encloses a disk 12 which forms the electrochemically reversible anode as described with reference to FIG. 3. The drive means includes a motor 11 whose shaft 11a is coaxial with the disk and affixed thereto while a liquid seal 11b is provided between a stationary terminal sleeve 11c and the rotating shaft 11a, this seal containing mercury or some other conductive liquid whereby the anode terminal sleeve 11c is connected with the disk 12. The disk 12 is juxtaposed with an auxiliary screen electrode 14 against which the reversible electrode 12 can be charged and which maintains an ion-migration path from the reversible electrode to an air-depolarized electrode 15 which is separated from the auxiliary electrode by a sheet of porous nonwoven fabric 11d resistant to deterioration in the electrolyte. This fabric can be composed of polymeric fiber and be of the type marketed under the trade name Pellon. A system of this general character, wherein a reticulate electrode 14 is disposed between a gas-permeable depolarized electrode 15 and the reversible electrode 12, is described and claimed in Patent No. 3,219,486. The porous electrode 15 and the housing 8 enclose a compartment for an alkaline electrolyte 11e, the compartment being maintained at slightly reduced pressure at 17 to counteract the hydrostatic pressure tending to flood the pores of the electrode 15 with electrolyte.

The gas-depolarized cell can be fully enclosed in a canister or other receptacle R whose volume may be such that it contains all of the gaseous depolarizer necessary for the subsequent discharge, the gas being produced and retained in the sealed system during charge and stand. If, for space considerations, the receptacle R must be smaller than the required volume, it may be connected by an umbilical tube U with a tank T, constituting the remainder of the necessary volume. The receptacle R and tank T are hermetically sealed.

It should be noted that the use of a reduced pressure to resist the tendency of the electrolyte to flood the pores of the gas-depolarized electrode material may not be required if the gas-depolarized member evidences no tendency toward such flooding. The use of hydrophobic resins in the body of a gas-depolarized electrode has markedly decreased such tendencies and has led to the maintenance of gas channels therein without the need for other means to ensure the availability of the three-phase menisci over considerable regions of the gas-depolarizable electrode. While reference has been made to oxygen or air as the depolarizing gas, it will be understood that other conventional gaseous depolarizers (e.g. chlorine) can be employed.

The rear side of this electrode is aligned with a filter 16 adapted to remove carbon dioxide from the air supplied to the porous electrode. A suitable filter can consist of a sheet of filter paper capillarily wetted by a bath 16a of potassium hydroxide. While this arrangement disposes the auxiliary electrode between the gas-depolarizable member and the reversible electrode, it is also possible to place the latter between the auxiliary and gas-depolarizable electrode in accordance with this invention.

It was found that this cell could be operated over a large number of cycles, without a wiper, by rotating the disk 12 rapidly during charging against the auxiliary electrode 14 (i.e. while zinc is plated on the disk) and thereafter discharging the electrode, with the disk either stationary or rotating against the air-depolarized electrode for a large number of cycles without any material loss of capacity of the anode. Without the wiper, a high-rate rotation of 100 to 1400 r.p.m. with a disk of about 5 cm. diameter was required during charging. The rotation rate during charging could be markedly reduced while the high-rate discharge capabilities of the system were improved by the use of an elastic-tube wiper 13 in contact with the active layer as described with reference to FIG. 3. Under these circumstances (i.e. with a wiper), a cell of the type shown in FIG. 4, using a reversible-electrode disk of about 5 cm. in diameter with an active area of about 13 cm.$^2$, a noble-metal-catalyzed oxygen electrode 15, a wide-mesh (nickel) auxiliary electrode 14 and a 35% aqueous solution of potassium hydroxide saturated with zinc oxide and in equilibrium with solid zinc oxide, a speed of only 4 revolutions per minute was required. In general, speeds from 1 to 100 r.p.m. were effective. At a speed of 4 revolutions per minute, the cell was charged to a capacity of 0.2 ampere hours per cm.$^2$ at the rate of 0.015 ampere per cm.$^2$ and discharged at 0.04 ampere per cm.$^2$ and 0.9 volt repeated cycling under these conditions showed no tendency toward shorting although charging without rotation of the disk led to the formation of a bridge between the auxiliary electrode 14 and the rechargeable electrode within one hour. This bridge was broken by commencement of rotation of the disk.

Figure 7:
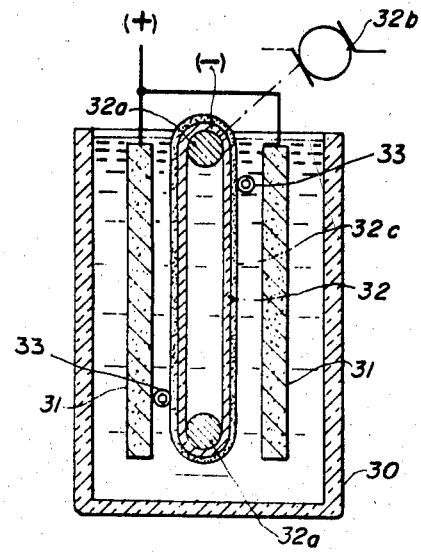
FIG. 7 is a side-elevational view, partly broken away, of a modified battery using a band-type movable electrode member.
Figure 8:
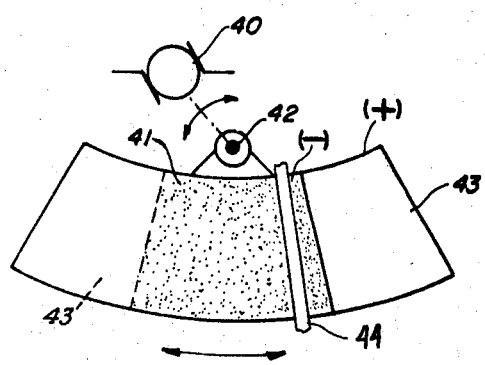
FIG. 8 is a view similar to FIG. 7, diagramatically illustrating a system having an oscillatable electrode.

In FIGS. 5 and 6, there is shown another air-depolarized electrochemical system employing a rechargeable electrode according to the invention. In this system, the porous oxygen electrodes 19 are paired and form between them electrolyte compartments 19a in which the rechargeable-electrode disks 18 are rotatably journaled upon pins 20 which are insulated from the associated gas-depolarized electrodes 19 but electrically contact corresponding electrodes of adjacent cells via their outer surfaces 20a which engage contact members 19b of these adjacent cells so that the respective cells are connected in series. The disks 18 are driven by respective drive gears 23 meshing with the masked or insulated toothed peripheries 18a of the disks. The drive means 22 can be a motor whose shaft 22a carries the gears 23 which are composed of insulating material and received within a hood 24a overlying the housing 25a and communicating with the compartments 19a. An outlet 24 of the hood 24a can be connected to a suction source for reducing the tendency of the electrolyte to flood the pores of the electrodes 19; the housing 25a can have openings 25 spanned by the decarbonation filters 25b through which air is admitted to the spaces between the porous electrodes 19. Wiper members 21 are disposed on opposite sides on each of the disks 18 to compact the respective dendritic layers. In FIG. 7, the housing 30 encloses a pair of rechargeable counterelectrodes 31 disposed on opposite sides of a moving rechargeable anode 32 in the form of a band passing over rollers 32a driven by a motor 32b. The deposit of dendritic zinc 32c upon this band is compacted by a pair of fixedly positioned tube-like wipers 33 in the manner previously described. In this case, the movable electrode member is linearly displaceable in its plane. In the arrangement of FIG. 8 the drive motor 40 is a source of angular oscillations and is coupled with the sector-shaped reversible electrode 41 journaled by the shaft 42 to the housing (not shown). Counterelectrodes 43 are alingnable with the rechargeable electrode 41 in at least one position thereof as the electrode 41 carries the dendritic layer past a stationary roller-type wiper 44 which compresses the layer.

Figure 9:
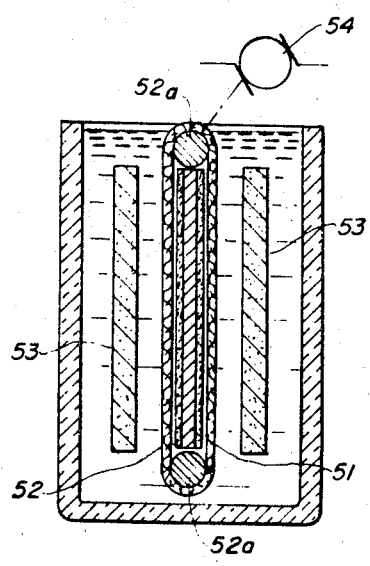
FIG. 9 is a view similar to FIG. 7 of a battery according to the invention wherein an intermediate member is movable.

In the system of FIG. 9, neither the rechargeable electrode member 51 nor the counterelectrode 53 are movable, but a woven-fabric band 52 constitutes a movable member interposed between the electrodes and can serve as a wiper for deflecting the dendritic growth. The band 52 is carried on rollers 52a and is displaced by a drive motor 54 while effecting a pumping action which destroys the concentration gradient tending to form in the electrolyte at least in the region of the rechargeable electrode. The fabric band, e.g. of nylon, can be replaced by a wire mesh when the intermediate member is to be constituted as an auxiliary electrode for charging the zinc/zinc-oxide electrode 51.

Figure 10:
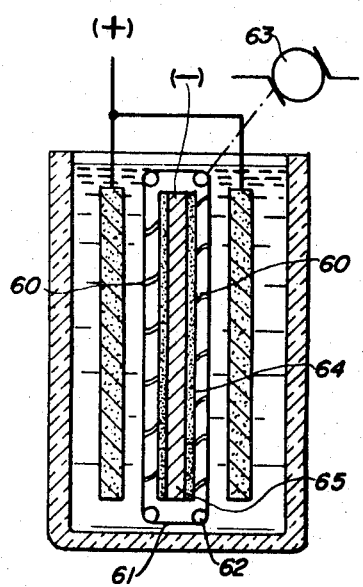
FIG. 10 is a similar view of another embodiment of the invention.

In the system illustrated in FIG. 10, a plurality of wiper blades 60 are carried by a pair of endless cords 61 at their opposite extremities, these cords being displaced over pulleys 62 by a motor 63. The blades 60 form acute angles with the layer 64 of the stationary rechargeable electrode 65 and can also serve as liquid-pumping vanes.

The invention as described and illustrated admits of various modifications within the ability of persons skilled in the art without departing from the spirit and scope of the invention as defined in the appended claims.

I claim:
1. In a rechargeable electrochemical current generator including a reversible electrode and a counterelectrode, said reversible electrode having a substantially flat working surface of active material confronting said counterelectrode, said active material being prone to develop growth formations extending toward said counterelectrode during charge, the combination therewith of wiper means interposed between said reversible electrode and said counterelectrode, and drive means for imparting a cyclic relative motion to said wiper means and said reversible electrode whereby said working surface is periodically swept by said wiper means within a time less than that required for said growth formations to reach said counterelectrode, said wiper means having a resilient body with a convex contact surface bearing upon said working surface so as to flatten said growth formations, said contact surface being generally cylindrically curved about an axis parallel to said working surface.

2. The combination defined in claim 1 wherein said wiper means comprises a rod extending substantially diagonally across said working surface and a pair of elastic sleeves journaled for independent rotation on respective halves of said rod.

3. The combination defined in claim 1 wherein said contact surface has an undulating profile.

4. The combination defined in claim 1 wherein said reversible electrode is a disk and said working surface is circular, said cyclic motion being a relative rotation about the center of said circular surface.

5. The combination defined in claim 4 wherein said wiper means comprises a unitary cylinder extending substantially diagonally across said working surface.

6. In a rechargeable electrochemical current generator including a disk-shaped reversible electrode and a counterelectrode, said reversible electrode having a circular working surface of active material confronting said counterelectrode, said active material being prone to develop growth formations extending toward said counterelectrode during charge, the combination therewith of wiper means interposed between said reversible electrode and said counterelectrode, and drive means for imparting a relative rotation to said wiper means and said reversible electrode about the center of said circular working surface whereby said working surface is periodically swept by said wiper means within a time less than that required for said growth formations to reach said counterelectrode, said wiper means having a resilient body with a convex contact surface bearing upon said working surface so as to flatten said growth formations, said wiper means comprising a rod extending substantially diagonally across said working surface and a pair of elastic sleeves journaled for independent rotation on respective halves of said rod.

References Cited

UNITED STATES PATENTS

| 316,436 | 4/1885 | Bazin | 136—141 |
| 717,395 | 12/1902 | Halsey | 135—140 |
| 3,260,620 | 8/1966 | Gruber | 136—86 |

FOREIGN PATENTS

| 734 | 4/1858 | Great Britain. |

WINSTON A. DOUGLAS, *Primary Examiner.*

M. J. ANDREWS, *Assistant Examiner.*

U.S. Cl. X.R.

136—141